United States Patent [19]

McComic

[11] Patent Number: 5,121,818
[45] Date of Patent: Jun. 16, 1992

[54] SOLAR POWERED COOLING APPARATUS FOR A VEHICLE BRAKE SYSTEM

[76] Inventor: Richard D. McComic, 1321 Jane Eyre, Memphis, Tenn. 38134

[21] Appl. No.: 694,685

[22] Filed: May 2, 1991

[51] Int. Cl.⁵ .................. F16D 65/78; F16D 55/02
[52] U.S. Cl. .................. 188/264 AA; 188/264 R; 188/264 A; 188/71.6; 188/382; 293/117; 136/291; 454/900
[58] Field of Search ....... 188/264 R, 264 A, 264 AA, 188/382, 71.6; 296/211; 293/117; 136/291; 454/900; 98/2.11

[56] References Cited

U.S. PATENT DOCUMENTS

| 3,943,726 | 3/1976 | Miller | 136/291 X |
|---|---|---|---|
| 4,432,273 | 2/1984 | Devitt | 136/291 X |
| 4,653,788 | 3/1987 | Di Giusto | 293/117 |
| 4,741,256 | 5/1988 | Huang | 136/291 X |
| 4,788,904 | 12/1988 | Radtke | 454/900 X |
| 4,800,803 | 1/1989 | Farmont | 454/900 X |
| 4,804,140 | 2/1989 | Cantrell | 136/291 X |
| 4,899,645 | 2/1990 | Wolf et al. | 136/291 X |

Primary Examiner—George E. A. Halvosa
Assistant Examiner—Peter M. Poon
Attorney, Agent, or Firm—Leon Gilden

[57] ABSTRACT

A solar powered cooling apparatus for a vehicle brake system utilizing a solar cell panel mounted within a vehicle front bumper to selectively actuate a blower motor located within an air duct housing. The air duct housing is connected to the front bumper of which has a plurality of forward openings with filtering screens so as to direct cool air flowing from the openings to the associated disk brake rotor. A plurality of openings are also formed on the top panel of the bumper of which the solar panel is operatively associated and where the openings can be adjusted via a slide plate operative through a push-pull cable located in a passenger compartment of the vehicle.

3 Claims, 5 Drawing Sheets

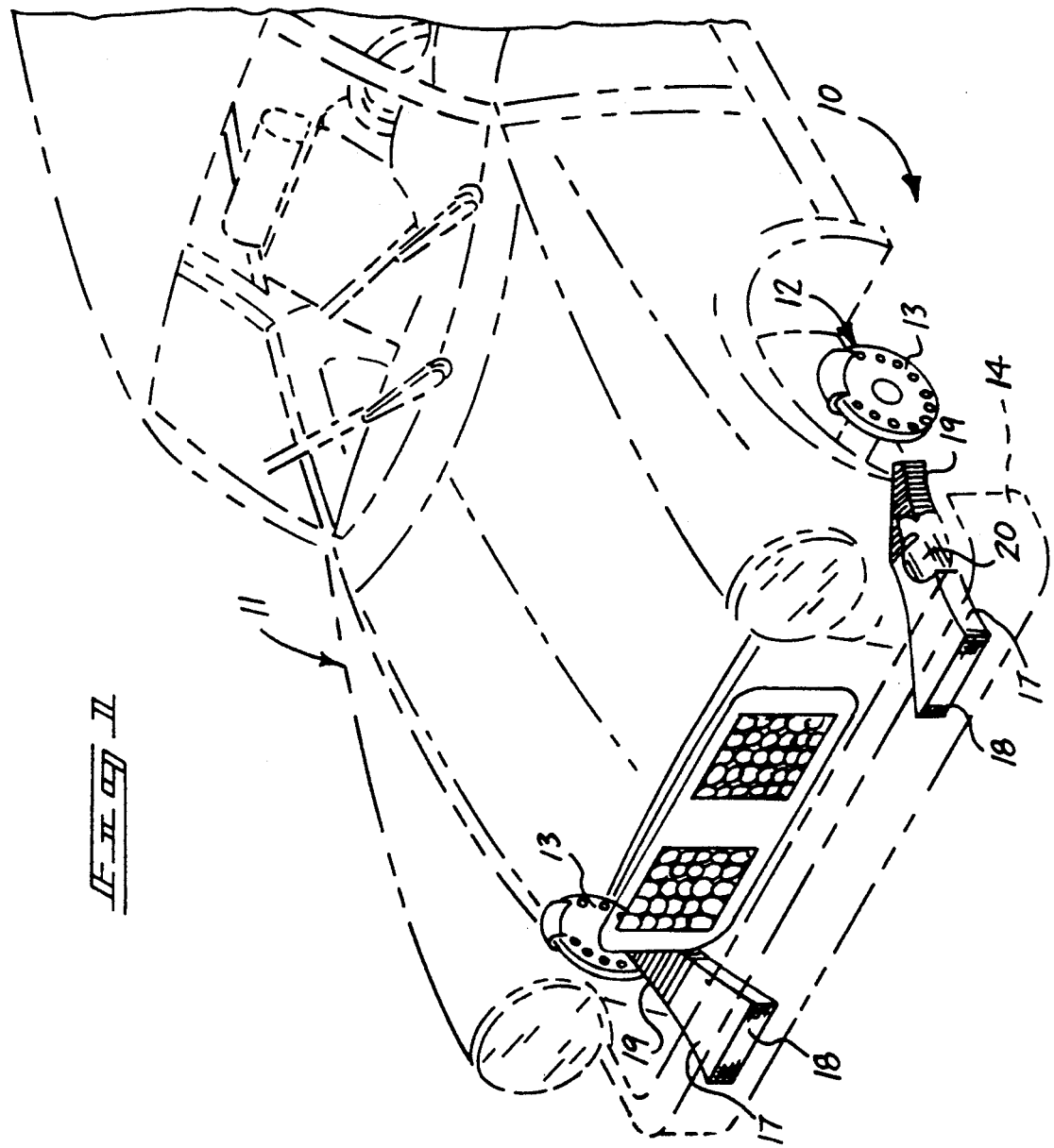

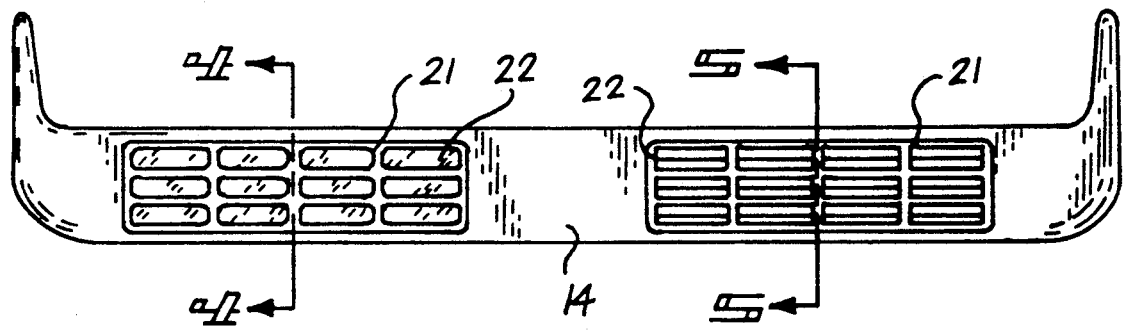
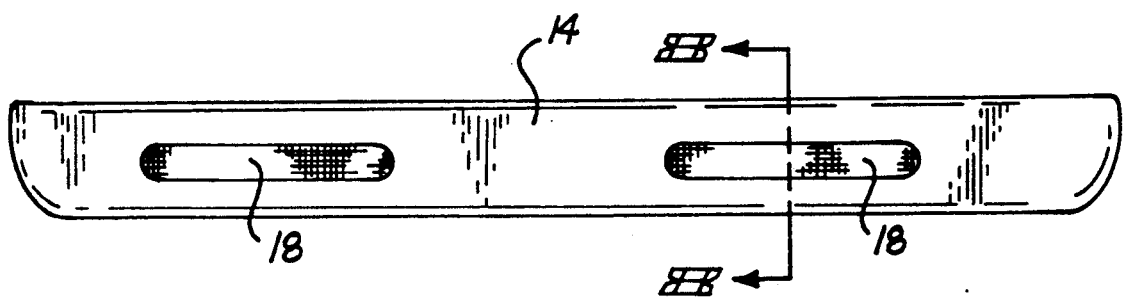

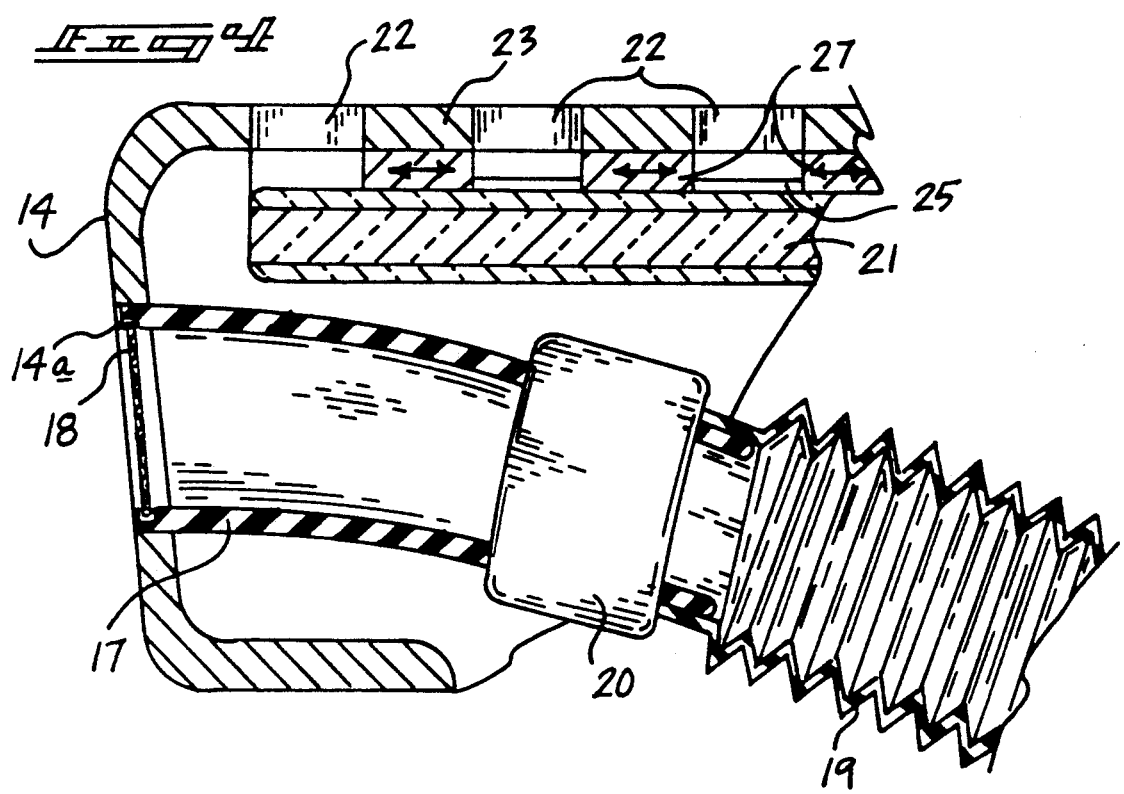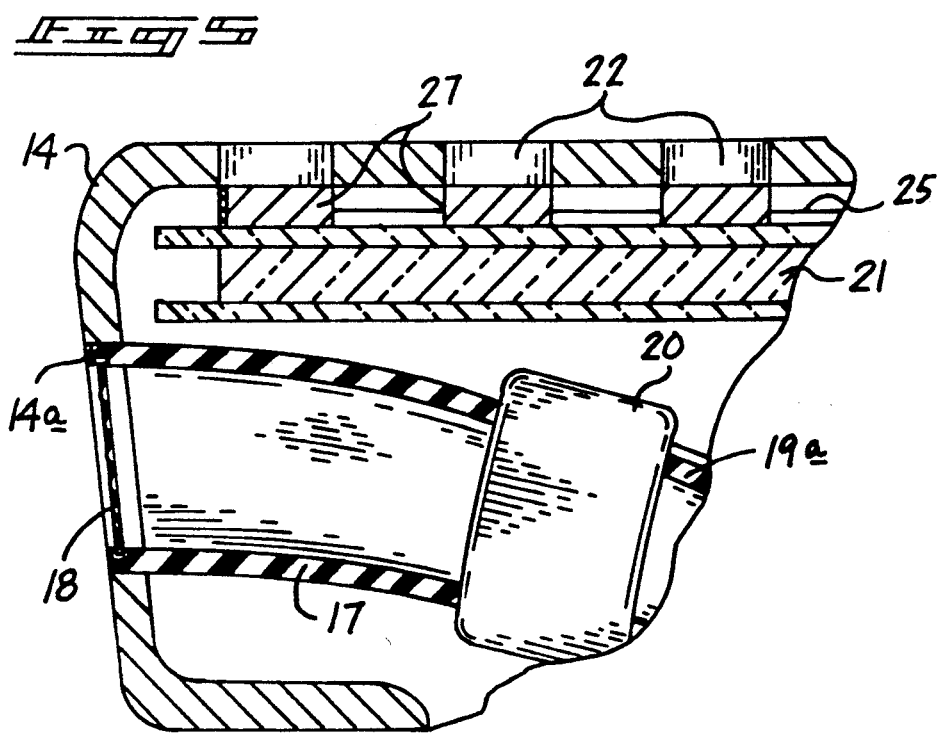

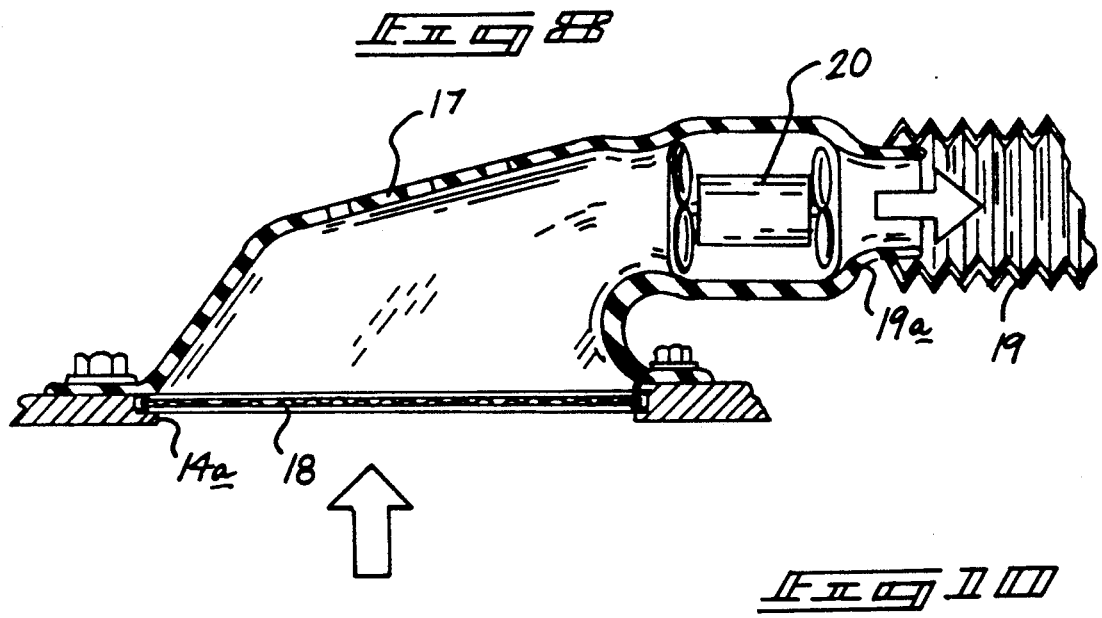
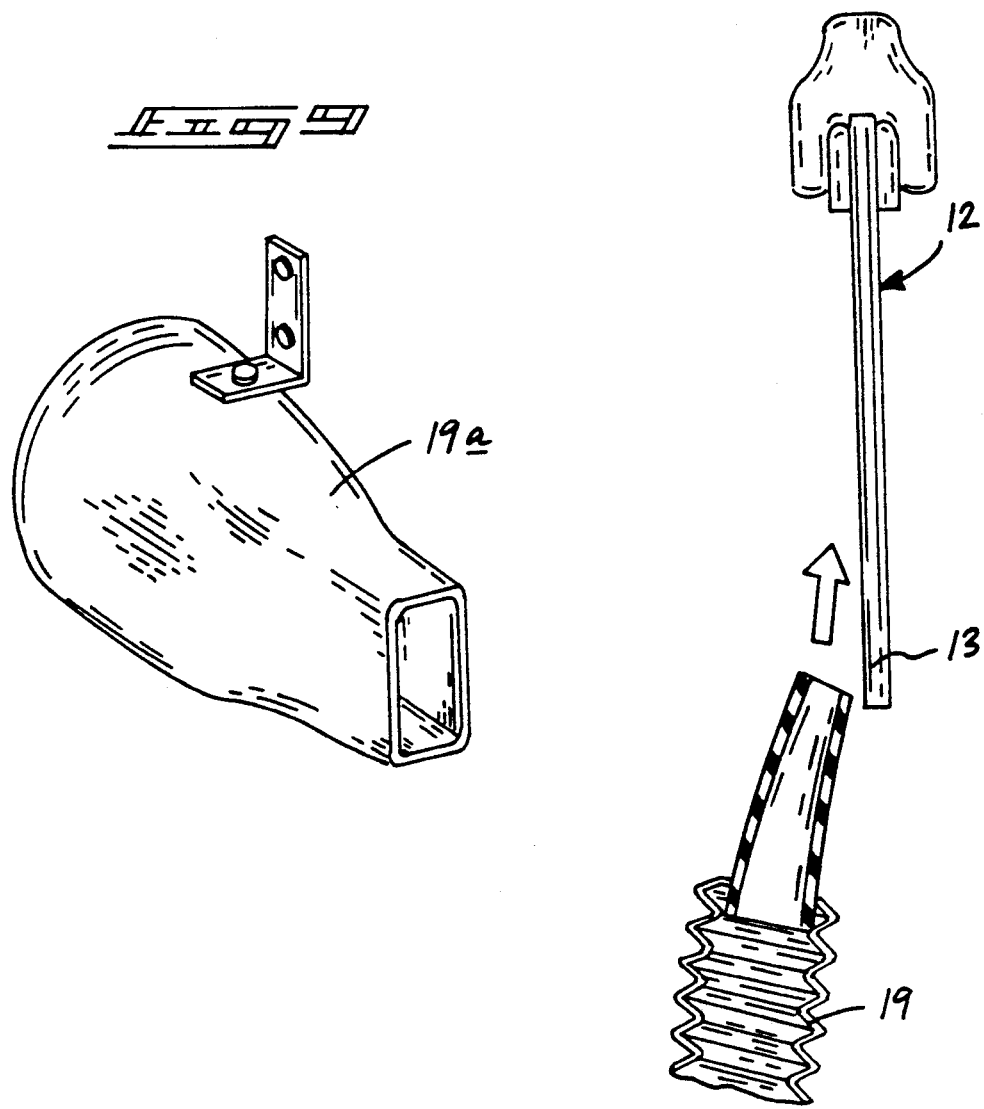

SOLAR POWERED COOLING APPARATUS FOR A VEHICLE BRAKE SYSTEM

BACKGROUND OF THE INVENTION

1. Field of the Invention

The field of invention relates to ventilating apparatus, and more particularly pertains to a new and improved solar brake cooling apparatus wherein the same utilizes solar cells to effect selective cooling of associated disc brake assemblies.

2. Description of the Prior Art

Vehicular ventilation has been utilized in the prior art to effect ventilation of typical passenger compartments on an associated vehicle. Such ventilation apparatus is provided to enhance cooling of passenger compartments for example. Such an apparatus is exemplified in U.S. Pat. No. 4,741,256 to Huang wherein air inlet devices are arranged to direct air into the passenger compartment utilizing forced ventilation to direct air into the passenger compartment for direct application to an operator of the vehicle.

U.S. Pat. No. 4,899,645 to Wolfe, et al. sets forth a powered ventilator utilizing solar cells to operate a ventilation organization.

U.S. Pat. No. 4,800,803 to Farmont sets forth a ventilation device mounted within a roof window of a vehicle to direct ventilation interiorly of the vehicle.

U.S. Pat. No. 4,804,140 to Cantrell sets forth a solar powered ventilating system for use in automotive vehicles mounting solar cells throughout the body panels of the roof of the vehicle.

U.S. Pat. No. 4,788,904 to Radtke sets forth an assembly for cooling an interior of a vehicle, more specifically the passenger compartment, utilizing solar cell operative structure.

As such, it may be appreciated that there continues to be a need for a new and improved solar brake cooling apparatus as set forth by the instant invention which addresses both the problems of ease of use as well as effectiveness in construction in providing direct air flow to an associated disc assembly to enhance longevity and operative use of each assembly in an automotive environment.

SUMMARY OF THE INVENTION

In view of the foregoing disadvantages inherent in the known types of automotive cooling apparatus now present in the prior art, the present invention provides a solar brake cooling apparatus wherein the same utilizes solar cells mounted within a vehicular front bumper selectively actuated to direct cooling air to an associated disc brake assembly of the associated vehicle. As such, the general purpose of the present invention, which will be described subsequently in greater detail, is to provide a new and improved solar brake cooling apparatus which has all the advantages of the prior art cooling apparatus and none of the disadvantages.

To attain this, the present invention provides an automobile vehicle mounting a front bumper including a plurality of air duct housings, with the air duct housing positioned forwardly and in general alignment with an associated disc brake assembly of the vehicle. The housing is positioned underlying a solar cell panel which is operative to effect selective actuation of blower motors to direct cooling air to the disc brake assembly. Adjustment of the solar cell panels is operative through a push-pull cable mounted within the passenger compartment of an associated automotive vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar brake cooling apparatus which has all the advantages of the prior art cooling apparatus and none of the disadvantages.

It is another object of the present invention to provide a new and improved solar brake cooling apparatus which may be easily and efficiently manufactured and marketed.

It is a further object of the present invention to provide a new and improved solar brake cooling apparatus which is of a durable and reliable construction.

An even further object of the present invention is to provide a new and improved solar brake cooling apparatus which is susceptible of a low cost of manufacture with regard to both materials and labor, and which accordingly is then susceptible of low prices of sale to the consuming public, thereby making such solar brake cooling apparatus economically available to the buying public.

Still yet another object of the present invention is to provide a new and improved solar brake cooling apparatus which provides in the apparatuses and methods of the prior art some of the advantages thereof, while simultaneously overcoming some of the disadvantages normally associated therewith.

Still another object of the present invention is to provide a new and improved solar brake cooling apparatus wherein the same is operative to effect selective cooling of an associated disc brake assembly of a vehicle to enhance longevity and effective use of the disc brake assembly in situations required in prolonged usage of the disc brake organization, such as descending hills, congested traffic driving situations, and the like.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention is associated with an automotive vehicle.

FIG. 2 is an orthographic top view of the organization mounted within the vehicle front bumper.

FIG. 3 is an orthographic front view of the organization mounted within the vehicle front bumper.

FIG. 4 is an orthographic view, taken along the lines 4—4 of FIG. 2 in the direction indicated by the arrows.

FIG. 5 is an orthographic view, taken along the lines 5—5 of FIG. 2 in the direction indicated by the arrows.

FIG. 8 is an orthographic view, taken along the lines 8—8 of FIG. 3 in the direction indicated by the arrows.

FIG. 9 is an isometric illustration of a funnel housing utilized in cooperation with the blower motor of the instant invention.

FIG. 10 is an orthographic end view, partially in section, of the cooling duct directed to an associated rotor of a disc brake assembly.

DESCRIPTION OF THE PREFERRED EMBODIMENT

Figure 6:
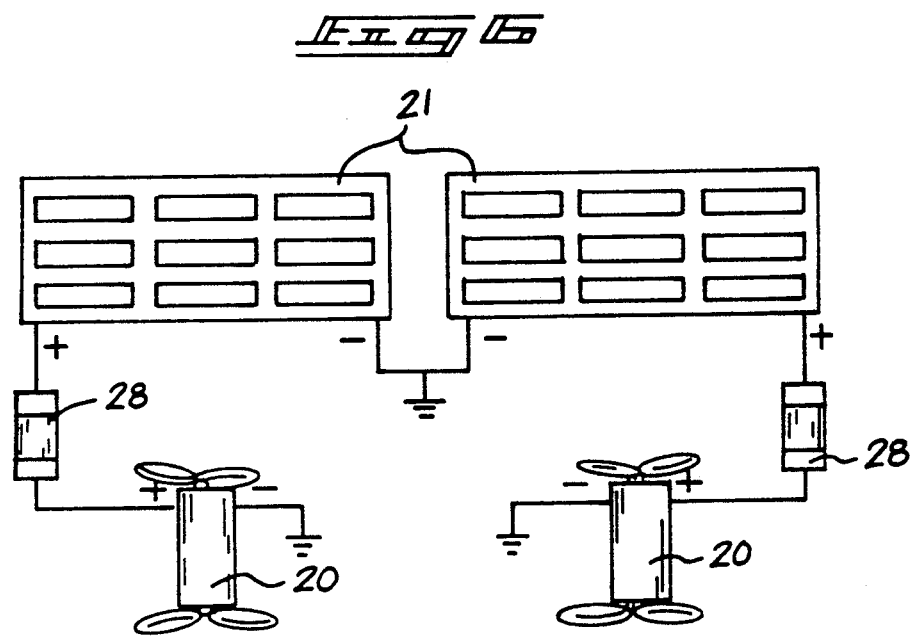
FIG. 6 is a diagrammatic illustration of the solar powered cell structure utilized by the instant invention.
Figure 7:
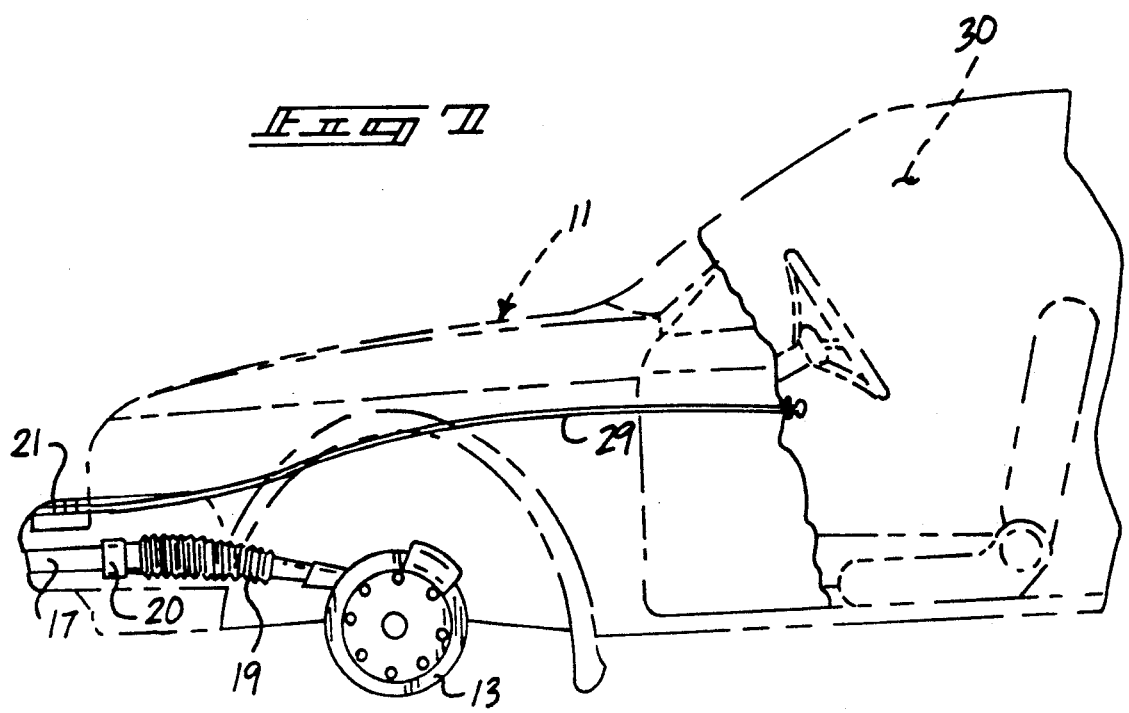
FIG. 7 is an orthographic side view illustrating the cooling duct directed to an associated disc brake assembly.

With reference now to the drawings, and in particular to FIGS. 1 to 10 thereof, a new and improved solar brake cooling apparatus embodying the principles and concepts of the present invention and generally designated by the reference numeral 10 will be described.

More specifically, the solar brake cooling apparatus 10 of the instant invention is utilized in combination with a self-propelled vehicle 11, including a disc brake rotor and calliper assembly 12 mounted relative to each front wheel of the vehicle 11. The vehicle further includes a vehicle front bumper 14 that extends across a forward end portion of the vehicle, with the vehicle front bumper 14 including a plurality of air duct housings 17 positioned within the bumper 14, with an air duct housing 17 positioned forwardly and in general alignment with an associated disc brake rotor and calliper assembly 12, with each disc brake and rotor and calliper assembly including a rotor 13. The air duct housing 17 directs cooling air from the air duct housing through an associated accordion pleated directional conduit 19 formed of a thermo-setting polymeric material to position and align the directional conduit 19 to direct cooling air to each rotor 13. A blower motor 20 is operative to direct air directed through the vehicle front bumper through an associated bumper forward opening 14a (see FIG. 4 for example) through the filter screen 18 to direct air to the associated rotor 13. Each blower motor 20 of each air duct housing 17 is operative through a solar cell panel 21. As illustrated in FIG. 2, each solar cell panel 21 is defined by a matrix of openings 22 defining generally a rectangular array, but may be of any desired geometric configuration defining individual openings. The openings 22 are formed through a top panel plate 23 that is mounted within a horizontal portion of the bumper 14, whereas the bumper forward openings 14a are directed through a vertical portion of the bumper 14. A slide plate 25 interconnects associated slide plate vanes 27 to cover the matrix openings 22 with an associated vane 27 arranged in cooperation with an associated or respective opening 22 to permit sunlight to be passed to the solar panel 21, or alternatively block sunlight directed to the solar panel 21 to thereby control operation of the blower motor 20 to either operate to cool an associated rotor 13 when required or to continue use of the blower motor during periods of non-use. Alternatively, a temperature sensor organization (not shown) may be utilized to utilize temperature sensitive readings of the disc brake rotor and calliper assembly 12 to effect actuation of the associated blower motor 20.

The slide plate 25 is operative through a push-pull cable 29 directed into the passenger compartment 30 of the associated vehicle 11 to effect sliding of the slide plate 25 and the associated vanes 27 to selectively cover or uncover the openings 22 to direct cooling air through an associated funnel housing 19a to subsequently direct such air through the directional conduit 19 to direct air to the rotor 13, in a manner as illustrated in FIG. 10.

It should be noted that the solar cell panels 21 are operative through a fuse 28 associated with each blower motor 20, whereupon overheating of each motor 20 effects each respective fuse 28 to discontinue electrical energy to an associated blower motor for safety of the organization in use in an automotive environment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar brake cooling apparatus in combination with a self-propelled vehicle, the self-propelled vehicle including a vehicle front bumper positioned forwardly of the vehicle, and a plurality of disc brake rotor and calliper assemblies positioned rearwardly of the vehicle front bumper, and the vehicle front bumper including a plurality of air duct housings, each air duct housing positioned forwardly and in general alignment with an associated disc brake rotor, and the vehicle front bumper including a bumper forward opening, the bumper forward opening including a filter screen directed coextensively therewithin, wherein the filter screen is mounted to a forward terminal end of the air duct housing, the air duct housing including a blower motor mounted therewithin, and a rear terminal end of the air duct housing including a funnel housing, the funnel housing mounting a directional conduit, the directional conduit directed from the funnel housing to a position adjacent an associated disc brake rotor, wherein each air duct housing includes a solar cell panel positioned above each air duct housing mounted within the vehicle front bumper and below a top wall of the vehicle front bumper in electrical communication with the blower motor to direct electrical energy to the blower motor to effect directing of cooling air from the air duct housing through the directional conduit to a respective disc brake rotor.

2. An apparatus as set forth in claim 1 wherein each solar cell panel is mounted below a top panel plate, the top panel plate includes a matrix of openings directed therethrough, and each panel plate is positioned above a respective solar cell panel, and a slide plate mounted between the matrix of openings and the top panel plate, the slide plate including slide plate vanes to effect selective reciprocation of the slide plate vanes relative to the slide plate openings, and a push-pull cable mounted to the slide plate at a forward end of the push-pull cable, and a rear terminal end of the push-pull cable mounted within a passenger compartment of the self-propelled vehicle.

3. An apparatus as set forth in claim 2 wherein the filter screen is mounted within a vertical surface of the vehicle front bumper.

* * * * *